(12) United States Patent
Sato et al.

(10) Patent No.: US 10,809,694 B2
(45) Date of Patent: Oct. 20, 2020

(54) SERVO SYSTEM AND GAIN ADJUSTMENT METHOD FOR SERVO MOTOR CONTROL

(71) Applicant: OMRON Corporation, Kyoto (JP)

(72) Inventors: Fumiaki Sato, Kyoto (JP); Daisuke Tamashima, Kusatsu (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 16/484,458

(22) PCT Filed: Mar. 6, 2018

(86) PCT No.: PCT/JP2018/008506
§ 371 (c)(1),
(2) Date: Aug. 8, 2019

(87) PCT Pub. No.: WO2018/168566
PCT Pub. Date: Sep. 20, 2018

(65) Prior Publication Data
US 2020/0033828 A1   Jan. 30, 2020

(30) Foreign Application Priority Data
Mar. 15, 2017   (JP) .................. 2017-050033

(51) Int. Cl.
*G05B 19/404*   (2006.01)

(52) U.S. Cl.
CPC .. *G05B 19/404* (2013.01); *G05B 2219/34013* (2013.01); *G05B 2219/41257* (2013.01)

(58) Field of Classification Search
CPC ......... H02P 29/00; G05B 11/00; G05B 11/36; G05B 19/00; G05B 19/404; G05B 2219/34013; G05B 2219/41257
See application file for complete search history.

(56) References Cited

U.S. PATENT DOCUMENTS 5,374,882 A * 12/1994 Matsubara ............. G05B 19/19
318/560
2001/0048283 A1* 12/2001 Kaitani .................... H02P 6/18
318/700

(Continued)

FOREIGN PATENT DOCUMENTS

JP   H06169584   6/1994
JP   2004246689   9/2004

(Continued)

OTHER PUBLICATIONS

"International Search Report (Form PCT/ISA/210) of PCT/JP2018/008506," dated Jun. 5, 2018, with English translation thereof, pp. 1-4.

(Continued)

*Primary Examiner* — Bentsu Ro
(74) *Attorney, Agent, or Firm* — JCIPRNET

(57) ABSTRACT

The present invention is provided with: a servo motor; a servo driver which supplies a driving current to the servo motor and drives the servo motor; and an information processing device which transmits, to the servo driver, an operation command signal of the servo motor, wherein a movement range limiting device is further provided, which executes, on the basis of the operation command signal from the information processing device, automatic tuning that adjusts a gain in a servo motor control, and which prevents, in the automatic tuning, the servo motor from moving beyond a permissible range by returning the position of the servo motor to a prescribed start position.

3 Claims, 6 Drawing Sheets

(56) References Cited

U.S. PATENT DOCUMENTS

| | | | | |
|---|---|---|---|---|
| 2003/0001536 A1* | 1/2003 | Kitajima | ................ | H02P 21/06 |
| | | | | 318/629 |
| 2008/0111514 A1* | 5/2008 | Ohta | ........................ | G05B 5/01 |
| | | | | 318/609 |
| 2016/0124417 A1* | 5/2016 | Ogawa | ................. | G05B 19/404 |
| | | | | 318/619 |

FOREIGN PATENT DOCUMENTS

| | | |
|---|---|---|
| JP | 2009194970 | 8/2009 |
| JP | 2011244668 | 12/2011 |
| WO | 2004008624 | 1/2004 |

OTHER PUBLICATIONS

"Written Opinion of the International Searching Authority (Form PCT/ISA/237) of PCT/JP2018/008506," dated Jun. 5, 2018, with English translation thereof, pp. 1-8.

* cited by examiner

SERVO SYSTEM AND GAIN ADJUSTMENT METHOD FOR SERVO MOTOR CONTROL

CROSS-REFERENCE TO RELATED APPLICATION

This application is a 371 of international application of PCT application serial no. PCT/JP2018/008506, filed on Mar. 6, 2018, which claims the priority benefit of Japan application no. 2017-050033, filed on Mar. 15, 2017. The entirety of each of the abovementioned patent applications is hereby incorporated by reference herein and made a part of this specification.

BACKGROUND

Technical Field

The invention relates to a servo system and a gain adjustment method for servo motor control in the servo system.

Description of Related Art

In recent years, servo systems have been put to use for positioning control of moving parts in various machines at manufacturing sites. A system, as such a servo system, includes a servo motor for operating various machines (load devices), a servo driver for driving the servo motor, and an information processing device for outputting position command information, etc. to the servo driver.

Here, in the control of the servo motor performed by the above-mentioned servo driver, automatic tuning is performed as a part of gain adjustment for adjusting the gain. The automatic tuning is a function of automatically adjusting gain parameters that determine gains such as position gain and speed gain of the servo driver through a trial and error operation of the load device, and a check process may be performed other than the gain adjustment process.

The gain adjustment process in the automatic tuning is a process of adjusting the servo gain to obtain the target response characteristic while repeatedly operating the load device. In the gain adjustment process, as the load device is operated until the target response characteristic is obtained, the number of trials is undefined. For example, it repeats a reciprocating motion, that is, in the first trial, the servo motor moves in a fixed direction (forward direction) by a fixed amount, and in the second trial, the servo motor moves in the direction opposite to the first trial by the same amount as the first trial and returning to the original position.

Moreover, in the check process, based on the gain adjusted in the gain adjustment process, the load device is further repeatedly operated to measure and check whether the target response characteristic is obtained. Thus, in the check process, from the position of the servo motor at the end of the gain adjustment process, the servo motor is further moved in the forward direction by the fixed amount in the first trial, and returns in the opposite direction in the second trial. Therefore, if the gain adjustment process is completed with an even number of trials, the check process is performed based on the stop position of the servo motor at the start of the gain adjustment process (hereinafter, also referred to as the start position). However, if the gain adjustment process is completed with an odd number of trials, the check process is performed based on a position different from the start position of the servo motor (hereinafter, also referred to as the movement position).

Then, in the check process, the servo motor is moved in the forward direction by the fixed amount as the first trial, and returned in the opposite direction as the second trial. Therefore, if the gain adjustment process is completed with an odd number of servo motor trials, in the check process, the movement amount of the servo motor in the forward direction temporarily increases. Then, the movement amount of the servo motor at this time may exceed the permissible range of the load device and cause damage to the load device. In addition, if the servo motor is stopped for some error in the middle of the gain adjustment process or the check process, and the gain adjustment process or the check process is performed again after the error is eliminated, the process is performed again based on the position where the servo motor is stopped. In this case, the movement amount of the servo motor may also exceed the permissible range of the load device and cause damage to the load device.

RELATED ART

Patent Document

[Patent Document 1] Japanese Laid-Open No. H6-169584

SUMMARY

Problems to be Solved

The invention has been made in view of the above problems and aims to provide a technology that can prevent a servo motor from moving beyond a permissible range and prevent the device from being damaged by movement of the servo motor that goes beyond the permissible range in the gain adjustment for the servo motor.

Means for Solving the Problems

In order to solve the above problems, in the invention, the position of the servo motor is returned to a predetermined start position in the gain adjustment for the servo motor, so as to prevent the servo motor from moving beyond the permissible range to damage the device.

More specifically, the invention includes: a servo motor; a servo driver supplying a driving current to the servo motor to drive the servo motor; and an information processing device sending an operation command signal of the servo motor to the servo driver. A gain adjustment for adjusting a gain in control of the servo motor is performed based on the operation command signal from the information processing device. The invention further includes a movement range limiting device that prevents the servo motor from moving beyond a permissible range by returning a position of the servo motor to a predetermined start position in the gain adjustment.

According to this, the servo motor is moved further from the state where the position of the servo motor is a position other than the predetermined start position, which makes it possible to prevent the servo motor from moving beyond the permissible range and causing damage to the device.

Moreover, in the invention, the gain adjustment may include a gain adjustment process of adjusting the gain by repeatedly moving the servo motor between the start position and a predetermined movement position while changing the gain, and the movement range limiting device may return the servo motor to the start position at the start of the gain adjustment process.

According to this, the position of the servo motor can be returned to the start position at the start of the gain adjustment process. Therefore, in the gain adjustment process, it is possible to more reliably prevent the servo motor from moving beyond the permissible range and causing damage to the device.

In addition, in the invention, if the servo motor is stopped in the middle of the gain adjustment, the movement range limiting device may return the position of the servo motor to the start position.

According to this, if the servo motor is urgently stopped for some reason in the middle of the gain adjustment, it is possible to prevent the gain adjustment from being performed again directly to prevent the servo motor from moving beyond the permissible range and causing damage to the device. Here, when the servo motor is stopped, it is considered that some error has occurred, or the servo motor is stopped by the intention of the user.

Further, in the invention, the gain adjustment may include: a gain adjustment process of adjusting the gain by repeatedly moving the servo motor between the start position and a predetermined movement position while changing the gain; and a check process of repeatedly moving the servo motor between the start position and the movement position by the gain adjusted by the gain adjustment process. The movement range limiting device may return the servo motor to the start position at the start of the gain adjustment process and/or the check process. Alternatively, the servo driver may include a check process implementation device that performs a check process of operating the servo motor by the gain obtained by the gain adjustment. The servo driver may perform the check process when receiving a check process start command from the information processing device. The check process implementation device may return the servo motor to the start position at the start of the check process.

According to this, the position of the servo motor can be returned to the start position at the start of the gain adjustment process and/or the check process. Therefore, in the gain adjustment process and/or the check process, it is possible to more reliably prevent the servo motor from moving beyond the permissible range and causing damage to the device.

Furthermore, in the invention, the movement range limiting device may return the position of the servo motor to the start position at the start of the check process if the gain adjustment process is completed with the servo motor moved an odd number of times between the start position and the movement position.

According to this, it is possible to determine whether the servo motor may move beyond the permissible range and cause damage to the device simply by determining whether the gain adjustment process is completed with the servo motor moved an odd number of times between the start position and the movement position. Thus, it is possible to prevent the servo motor from moving beyond the permissible range and causing damage to the device in the check process by simpler control.

In addition, in the invention, the servo driver may perform the gain adjustment process or the check process again if the servo motor is stopped in the middle of the gain adjustment process or the check process. The movement range limiting device may return the position of the servo motor to the start position before the gain adjustment process or the check process is performed again.

According to this, if the servo motor is urgently stopped for some reason in the middle of the gain adjustment process or the check process, it is possible to prevent the gain adjustment process or the check process from being performed again directly to prevent the servo motor from moving beyond the permissible range and causing damage to the device. Here, when the servo motor is stopped, it is considered that some error has occurred, or the servo motor is stopped by the intention of the user.

Furthermore, the invention provides a gain adjustment method for servo motor control, which adjusts a gain in control of a servo motor. The gain adjustment method may include: a gain adjustment process of adjusting the gain by repeatedly moving the servo motor between a predetermined start position and a predetermined movement position while changing the gain. The position of the servo motor may be returned to the start position at the start of the gain adjustment process, or when the servo motor is stopped in the middle of the gain adjustment process.

Moreover, the invention provides a gain adjustment method for servo motor control, which adjusts a gain in control of a servo motor. The gain adjustment method may include: a gain adjustment process of adjusting the gain by repeatedly moving the servo motor between a predetermined start position and a predetermined movement position while changing the gain; and a check process of repeatedly moving the servo motor between the start position and the movement position by the gain adjusted in the gain adjustment process. The position of the servo motor may be returned to the start position at the start of the gain adjustment process and/or the check process.

In addition, in the above gain adjustment method for servo motor control according to the invention, the position of the servo motor may be returned to the start position at the start of the check process if the gain adjustment process is completed with the servo motor moved an odd number of times between the start position and the movement position.

Further, the invention provides a gain adjustment method for servo motor control, which adjusts a gain in control of a servo motor. The gain adjustment method may include: a gain adjustment process of adjusting the gain by repeatedly moving the servo motor between a predetermined start position and a predetermined movement position while changing the gain; and a check process of repeatedly moving the servo motor between the start position and the movement position by the gain adjusted in the gain adjustment process. The gain adjustment process or the check process may be performed again if the servo motor is stopped in the gain adjustment process or the check process. The position of the servo motor may be returned to the start position before the gain adjustment process or the check process is performed again.

In the invention, means for solving the above-mentioned problems can be used in combination where possible.

Effects

It is possible to prevent the servo motor from moving beyond the permissible range and prevent the device from being damaged by movement of the servo motor that goes beyond the permissible range in the gain adjustment for the servo motor.

DESCRIPTION OF THE EMBODIMENTS

First Embodiment

Figure 1:
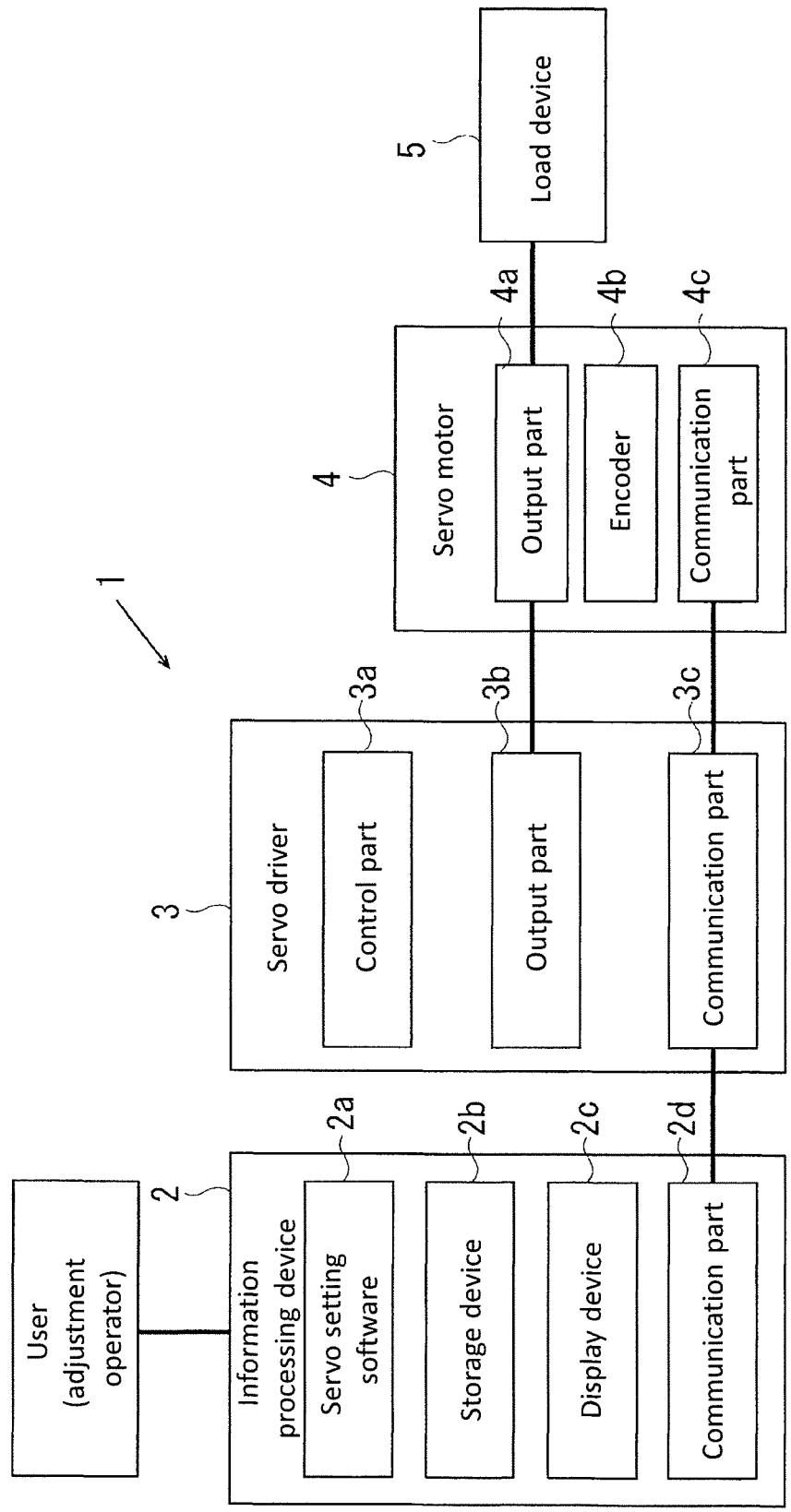
FIG. 1 is a block diagram showing a schematic configuration of the servo system according to an embodiment of the invention.

Hereinafter, an embodiment for carrying out the invention will be described in detail with reference to the drawings as an example. FIG. 1 is a schematic configuration diagram of a servo system 1 according to the present embodiment. The servo system 1 includes an information processing device 2, a servo driver 3, a servo motor 4, and a load device 5 to which the servo motor 4 is physically connected.

The information processing device 2 includes servo setting software 2a for the servo driver 3. The servo setting software 2a has functions of reading the position of the servo motor 4 from the servo driver 3, writing gain parameters of the servo motor 4 to the servo driver 3, reading the gain parameters of the servo motor 4 from the servo driver 3, etc. In addition, the servo driver 3 has a function of issuing an automatic tuning command. Moreover, the information processing device 2 is provided with a storage device 2b, a display device 2c, and a communication part 2d. The storage device 2b is a non-volatile memory that stores the position of the servo motor 4. The display device 2c displays a UI (user interface) provided by the servo setting software 2a. The communication part 2d communicates various pieces of information with the servo driver 3.

The servo driver 3 also has a control part 3a that controls the current supplied to the servo motor 4. The control part 3a has gain parameters internally and calculates the current supplied to the motor according to the gain parameters. In addition, the control part 3a receives the automatic tuning command (to be described later) from the servo setting software 2a and controls the current supplied to the servo motor 4 in automatic tuning. The servo driver 3 further has an output part 3b and a communication part 3c. The output part 3b supplies a direct current to the servo motor 4. The communication part 3c communicates with the servo motor 4 and the information processing device 2.

The servo motor 4 is physically connected to the load device 5 and transmits a rotational torque to the load device 5. The servo motor 4 includes an output part 4a, an encoder 4b, and a communication part 4c. The output part 4a outputs the rotational torque to the load device 5. The encoder 4b detects position (rotational position) information of the servo motor 4. The communication part 4c feeds back the position (rotational position) information to the servo driver 3. The load device 5 is connected to the servo motor 4 and is an object that a user (adjustment operator) tries to move.

Next, the automatic tuning performed in the servo system 1 according to the present embodiment will be described.

The automatic tuning is that: in order to set the gain parameters such as position gain and speed gain corresponding to each operation instruction based on the servo setting software 2a that instructs a series of operations, the servo motor 4 is enabled to perform a predetermined operation for updating the gain parameters corresponding to each operation. The automatic tuning is one of the adjustment methods for adjusting the gain in the servo system 1.

The automatic tuning includes a gain adjustment process of adjusting the gain parameters by trial and error while reciprocating the servo motor 4. The automatic tuning may also include a check process that is performed after the gain adjustment process to reciprocate the servo motor 4 based on the gain adjusted in the gain adjustment process to check if the value of the gain is appropriate.

In the gain adjustment process of the automatic tuning, the number of trials is undefined because the load device 5 is operated until the target response characteristic is obtained. In the first trial, the servo motor 4 moves in a fixed direction (forward direction) by a fixed amount from the position at the start (hereinafter, also referred to as the start position) and reaches the position after one trial (hereinafter, also referred to as the movement position). Then, in the second trial, the servo motor 4 moves in the direction opposite to the first trial by the same amount as the first trial and returns to the start position. Here, if the gain adjustment process is completed with an even number of trials, the position of the servo motor 4 at the time when the gain adjustment process is ended is the same as the start position. Therefore, when the check process is subsequently performed, the check process is performed based on the start position.

Figure 2:
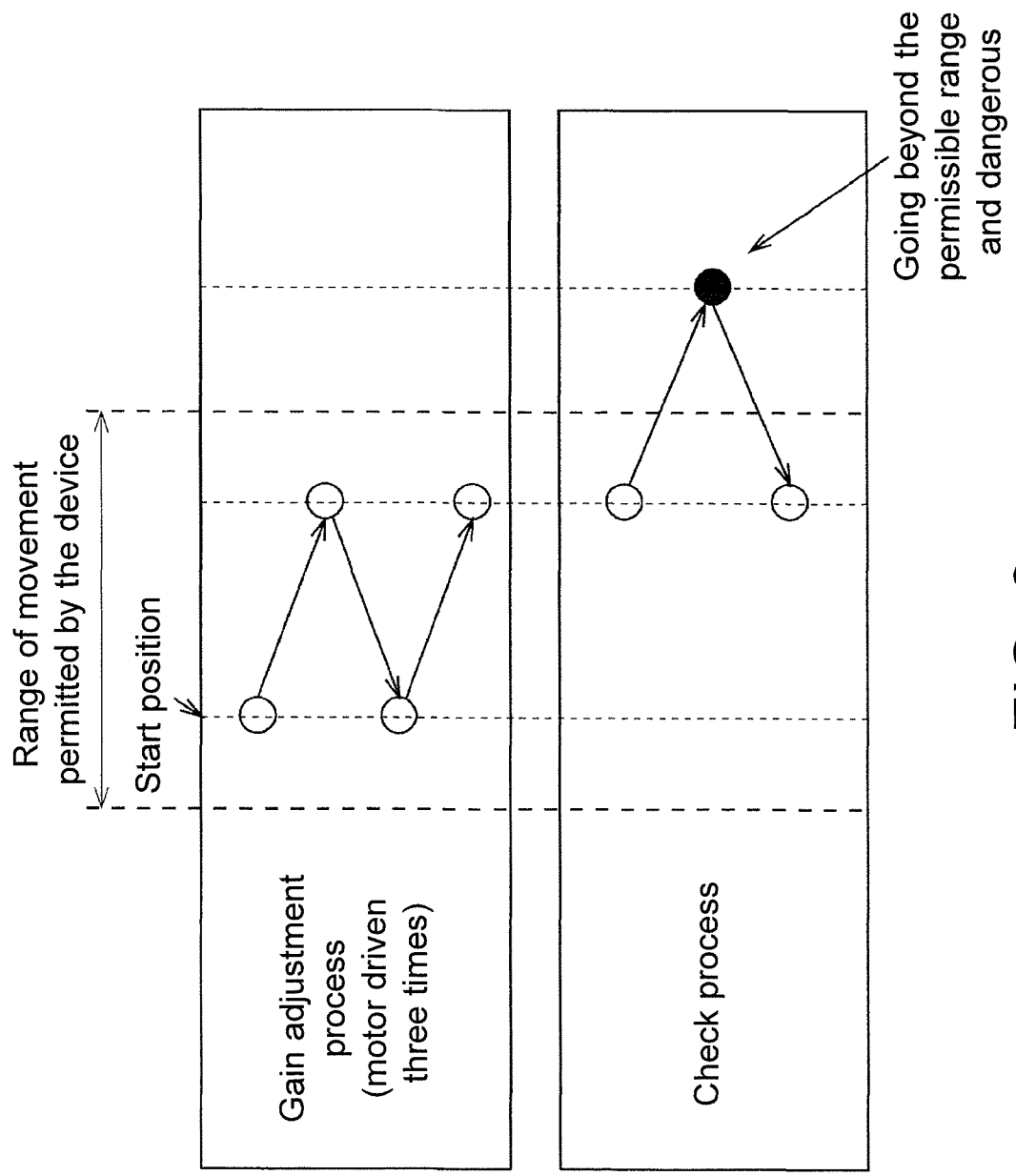
FIG. 2 is a diagram showing a change of the position of the servo motor in the conventional gain adjustment process and check process.

On the other hand, as shown in FIG. 2, if the gain adjustment process is completed with an odd number of trials, the position of the servo motor 4 at the end of the gain adjustment process is the movement position. Then, in the subsequently performed check process, another trial is performed based on the movement position different from the start position. Also, in the check process, the servo motor 4 is moved in the forward direction by the fixed amount and then returned in the opposite direction. Thus, in the check process, the movement amount of the servo motor 4 in the forward direction temporarily increases. The movement amount of the servo motor 4 at this time may exceed a permissible range of the load device 5 and cause damage to the load device 5.

Figure 3:
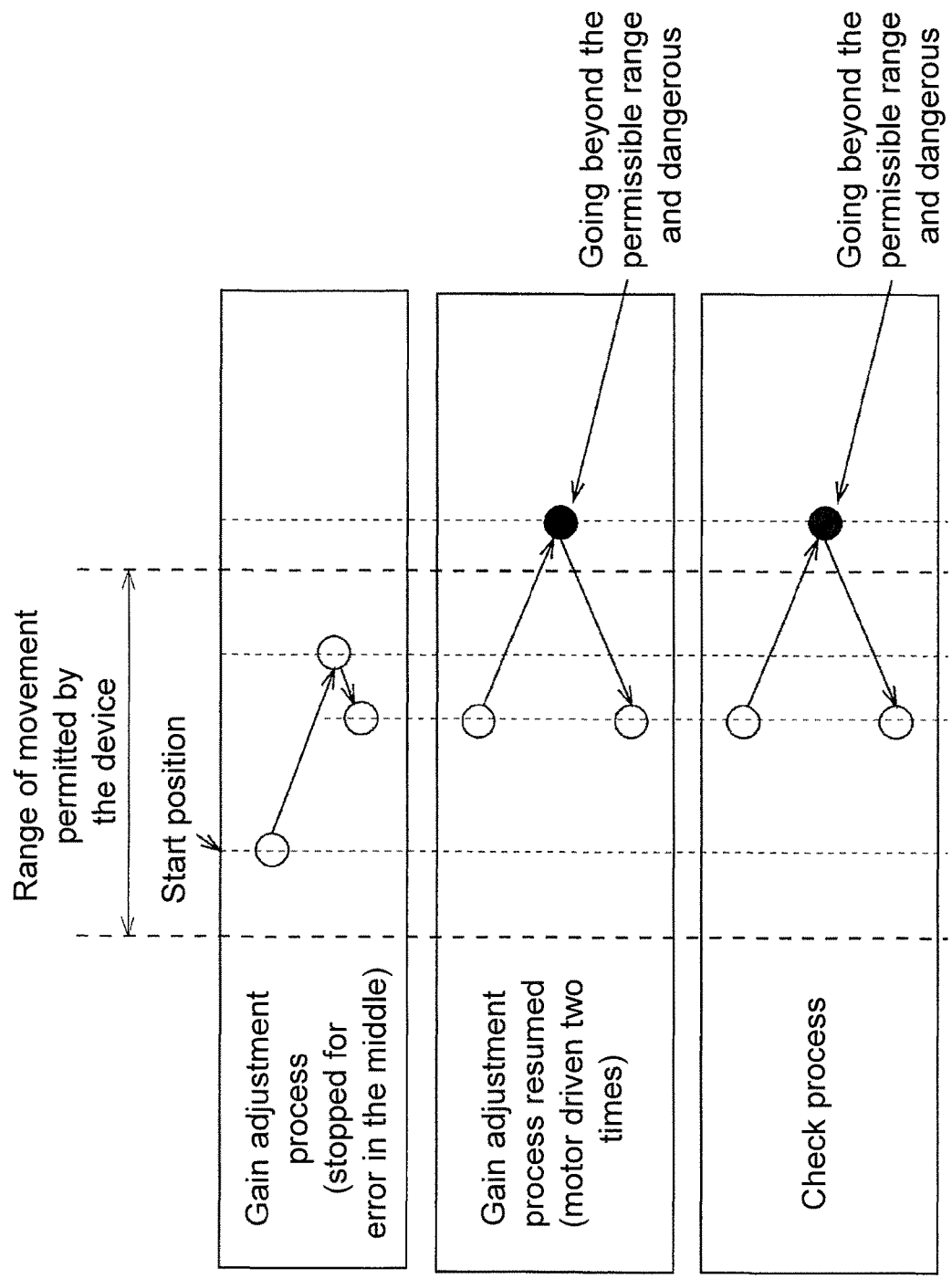
FIG. 3 is a second diagram showing a change of the position of the servo motor in the conventional gain adjustment process and check process.

In addition, in the automatic tuning, as shown in FIG. 3, for example, if the servo motor 4 is stopped for some error in the middle of the gain adjustment process, the gain adjustment process is performed again directly after the error is eliminated. That is, in this case, the gain adjustment process is started based on the position where the servo motor 4 stops. In this case, the movement amount of the servo motor 4 may also exceed the permissible range of the load device 5 and cause damage to the load device 5.

Furthermore, as shown in FIG. 3, when the gain adjustment process is ended in such a situation, if the check process is then started from the state where the servo motor 4 is at the position when the gain adjustment process is ended, similarly, the movement amount of the servo motor 4 may exceed the permissible range of the load device 5 and cause damage to the load device 5 in the check process.

Figure 4:
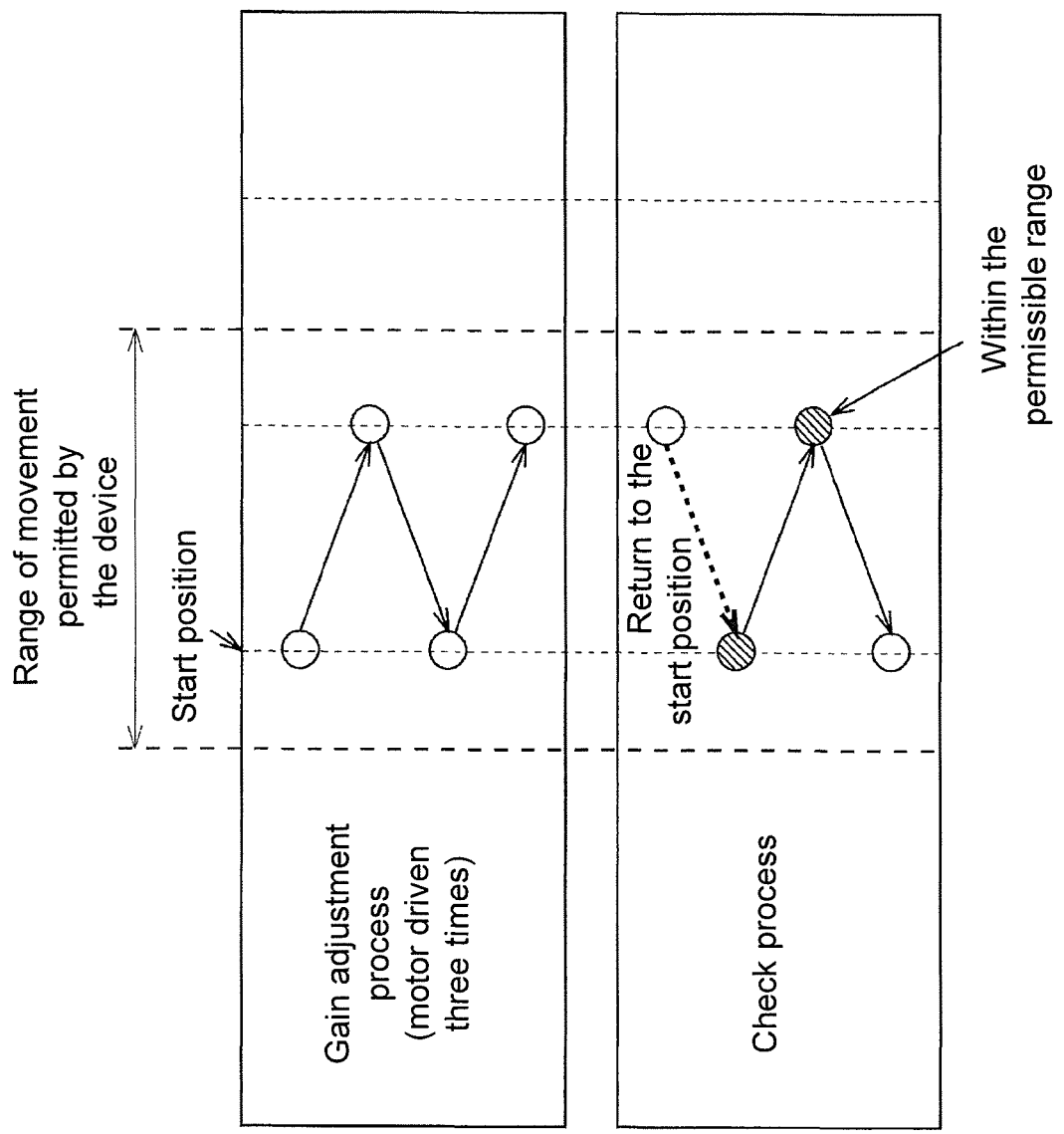
FIG. 4 is a diagram showing a change of the position of the servo motor in the gain adjustment process and the check process according to an embodiment of the invention.

In contrast thereto, in the present embodiment, as shown in FIG. 4, if the gain adjustment process is completed with an odd number of trials, the servo motor 4 is returned to the start position before the check process starts. Accordingly, it is possible to prevent the check process from being started from a state where the servo motor 4 is at a position different from the start position, and it is possible to prevent the servo motor 4 from going beyond the permissible range of the load device 5 in the check process.

Figure 5:
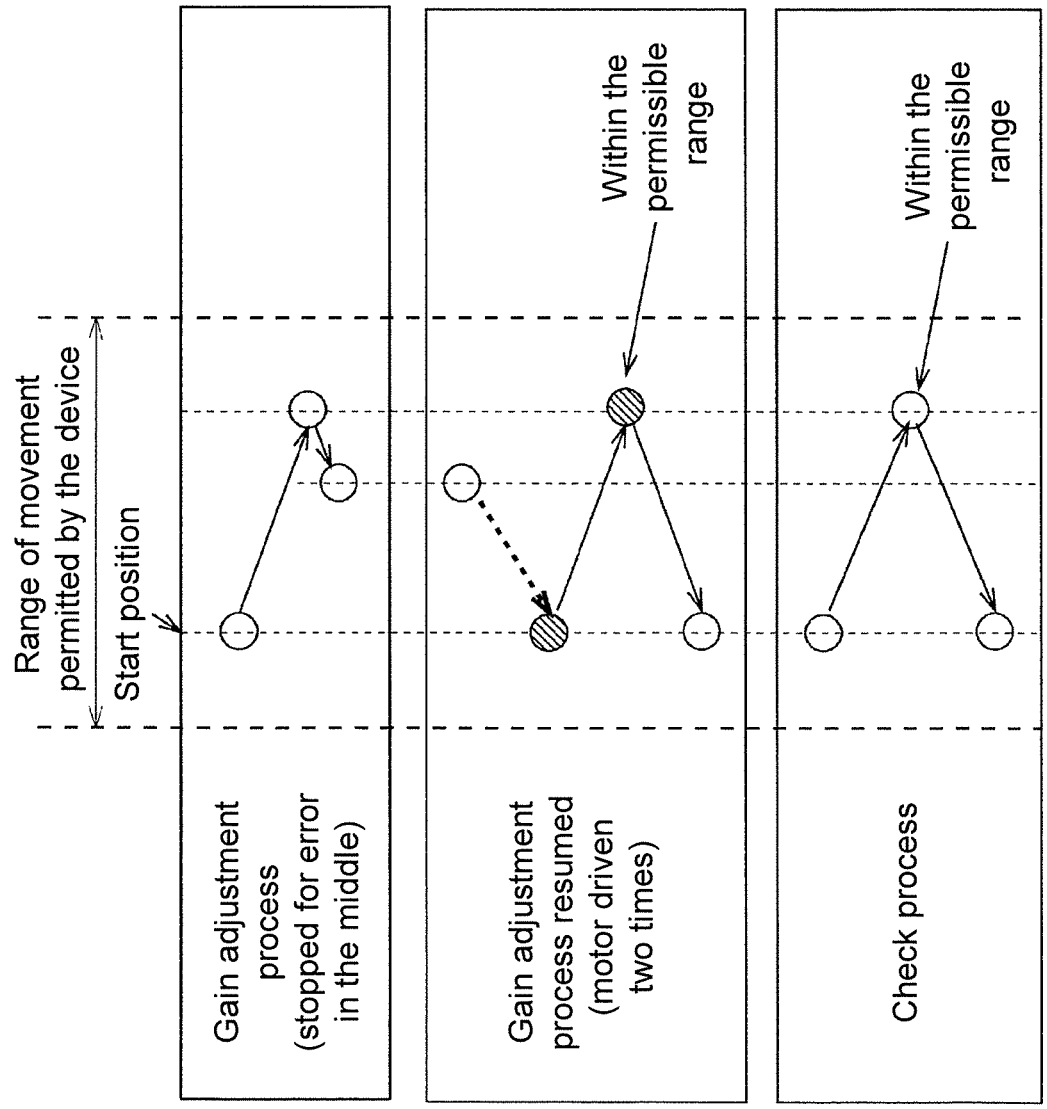
FIG. 5 is a second diagram showing a change of the position of the servo motor in the gain adjustment process and the check process according to an embodiment of the invention.

Also, in the present embodiment, as shown in FIG. 5, for example, the servo motor 4 is stopped for an error in the gain adjustment process, and the servo motor 4 is returned to the start position before the gain adjustment process is performed again. Accordingly, it is possible to prevent the gain adjustment process from being performed again from a state where the servo motor 4 is at a position different from the start position, and it is possible to prevent the servo motor 4 from going beyond the permissible range of the load device 4.

Figure 6:
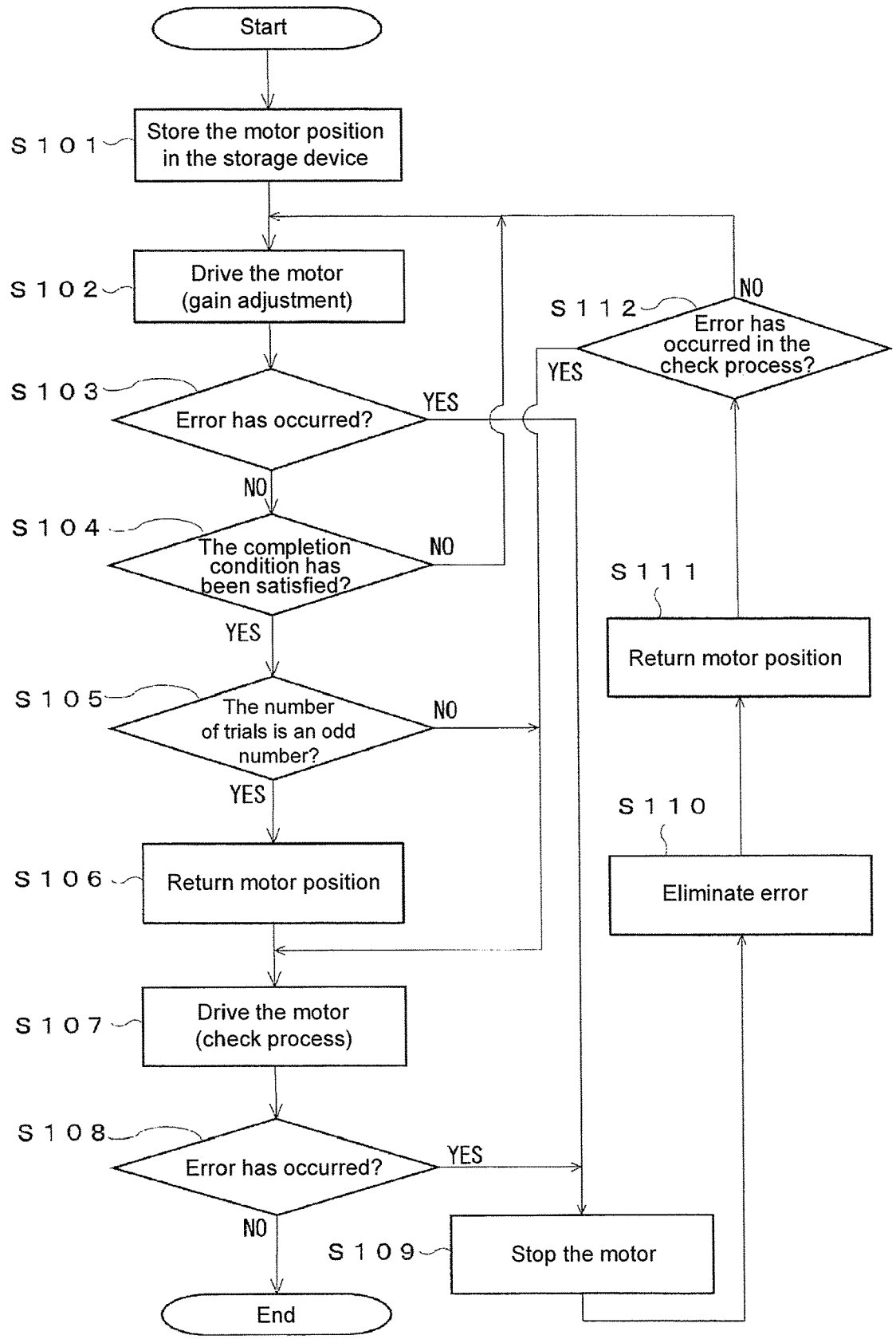
FIG. 6 is a flowchart showing the processing of an automatic tuning routine according to an embodiment of the invention.

FIG. 6 shows a flowchart of the processing content of an automatic tuning routine that is executed when automatic tuning is performed in the present embodiment. The routine is one of the servo setting software 2a possessed by the information processing device 2. When the routine is executed, first, in S101, a motor position that serves as the predefined start position, or an actual motor position at the start of the gain adjustment process of the automatic tuning is stored in the storage device 2b. When the process of S101 ends, the processing proceeds to S102.

In S102, the servo motor 4 performs a reciprocating motion and the gain adjustment process is started. That is, the servo motor 4 repeatedly moves between the start position and the movement position to perform a reciprocating motion. The movement position in this case is within the permissible range of the load device 5, and there is no problem as long as the servo motor 4 is moving in this range. When the process of S102 ends, the processing proceeds to S103. In S103, whether any error has occurred in the gain adjustment process is determined.

Here, if it is determined that no error has occurred, the processing proceeds to S104. If it is determined that an error has occurred, the processing proceeds to S109. In S109, the servo motor 4 is urgently stopped. Then, the processing proceeds to S110, and after the error is eliminated, the processing proceeds to S111 and the servo motor 4 is returned to the start position. When the process of S111 ends, the processing proceeds to S112, and whether this error is an error in the check process is determined. Here, since this error is an error in the gain adjustment process, a negative determination is made here. The processing returns to S102, the reciprocating motion of the servo motor 4 is restarted, and the gain adjustment process is performed again.

If it is determined in S103 that no error has occurred, in S104, whether a completion condition has been satisfied is determined. That is, in the gain adjustment process, whether the targeted response characteristic is obtained is checked. Then, if it is determined that the completion condition has not been satisfied, it is determined necessary to further perform the reciprocating motion of the servo motor 4 and the gain adjustment, so the processing returns to S102. On the other hand, if it is determined that the completion condition has been satisfied, the processing proceeds to S105. When the process of S104 ends, the gain adjustment process ends.

In S105, whether the number of trials in the gain adjustment process is an odd number is determined. Here, if the number of trials is determined to be an odd number, the servo motor 4 is at the movement position. Therefore, it is determined that if the processing proceeds to the check process in such a situation, the position of the servo motor 4 may go beyond the permissible range of the load device 5 and cause damage to the load device 5, so the processing proceeds to S106. On the other hand, if the number of trials is determined to be an even number, the servo motor 4 is at the start position. Therefore, it is determined that the position of the servo motor 4 will not go beyond the permissible range of the load device 5 even if the processing proceeds to the check process in such a situation, so the processing proceeds to S107.

In S106, the position of the servo motor 4 is returned to the start position. When S106 ends, the processing proceeds to S107. In S107, the check process is started, and movement of the servo motor 4 between the start position and the movement position is repeated based on the gain adjusted in the gain adjustment process. When the process of S107 ends, the processing proceeds to S108. In S108, whether any error has occurred in the check process is determined. Here, if it is determined that an error has occurred, the processing proceeds to S109. On the other hand, if it is determined that no error has occurred, it is determined that the check process ends normally, so the routine temporarily ends. Since the check process is basically completed with an even number of trials of the servo motor 4 (unlike the gain adjustment process, the number of trials is not undefined), the servo motor 4 has returned to the start position at the time when the routine ends.

Further, if it is determined in the check process that an error has occurred, the servo motor 4 is urgently stopped in S109, the error is eliminated in S110, and the servo motor 4 is returned to the start position in S111. Then, in S112, it is determined whether the error has occurred in the check process. Here, it is determined that the error has occurred in the check process and it is determined necessary to perform the check process again, so the processing returns to S107, and the movement of the servo motor 4 between the start position and the movement position is performed again based on the gain adjusted in the gain adjustment process. In the automatic tuning routine shown in FIG. 6, the information processing device 2 that performs the processes of S105 and S106, and S103 and S108 to S111 corresponds to the movement range limiting device in the present embodiment.

As described above, in the present embodiment, first, whether the number of trials of the servo motor 4 is an odd number or an even number is determined in the gain adjustment process of the automatic tuning. Then, if the number of trials is determined to be an odd number, it is determined that the servo motor 4 is stopped at the movement position, so the position of the servo motor 4 is returned to the start position before the processing moves on to the check process. In addition, if the number of trials of the servo motor 4 is determined to be an even number, it is determined that the servo motor 4 has returned to the start position at this time, so the processing moves on to the check process directly.

Moreover, if it is determined that an error has occurred in the middle of the gain adjustment process or the check process, it is determined that the servo motor 4 is stopped at a position different from the start position, so the position of the servo motor 4 is returned to the start position and then the gain adjustment process or the check process is performed again. According to the present embodiment, by further moving the servo motor 4 from a position different from the start position or from the movement position, it is possible to prevent the servo motor 4 from going beyond the permissible range of the load device 5 and causing damage to the load device 5.

The above embodiment illustrates an example of applying the invention to automatic tuning. However, the invention may also be applied when the user manually adjusts the gain. Similarly, the invention may also be applied when the user manually performs the check process. In addition, the above embodiment illustrates an example that the automatic tuning includes both the gain adjustment process and the check process. However, the invention may be applied to automatic tuning that includes only the gain adjustment process. For example, in FIG. 6, the gain adjustment is ended when the completion condition is satisfied in S104. Then, the servo driver performs the check process when receiving a command to start the check process from the information processing device. In that case, the servo motor is returned to the start position when the check process starts. Further, if the invention is applied to automatic tuning that includes only the gain adjustment process, the servo motor may be returned to the start position when the gain adjustment ends. Furthermore, the above embodiment illustrates that an error has occurred and caused the servo motor to be stopped in the gain adjustment process or the check process. However, the cause of the stop of the servo motor in the gain adjustment process or the check process is not necessarily an error, and the servo motor may be stopped at the discretion of the user.

In addition, the above embodiment illustrates an example that the motor as the start position is stored in the storage device 2b of the information processing device 2. However, the subject that stores and restores the start position is not necessarily the information processing device 2. The start position may be stored in a memory (not shown) included in the servo driver 3 and restored by the servo driver 3. The configuration of the servo system 1 in the above-described embodiment is merely an example, and it is possible to make any change without departing from the spirit of the invention.

What is claimed is:

1. A servo system, comprising:
    a servo motor;
    a servo driver supplying a driving current to the servo motor to drive the servo motor; and
    an information processing device sending an operation command signal of the servo motor to the servo driver,
    wherein a gain adjustment for adjusting a gain in control of the servo motor is performed based on the operation command signal from the information processing device, and
    the servo system further comprises a movement range limiting device that prevents the servo motor from moving beyond a permissible range by returning a position of the servo motor to a predetermined start position in the gain adjustment,
    the gain adjustment comprises a gain adjustment process of adjusting the gain by repeatedly moving the servo motor between the start position and a predetermined movement position while changing the gain, and
    the movement range limiting device returns the servo motor to the start position at the start of the gain adjustment process, or when the servo motor is stopped in the middle of the gain adjustment process.

2. The servo system according to claim 1, wherein the servo driver comprises a check process implementation device that performs a check process of operating the servo motor by the gain obtained by the gain adjustment,
    the servo driver performs the check process when receiving a check process start command from the information processing device, and
    the check process implementation device returns the servo motor to the start position at the start of the check process.

3. A gain adjustment method for servo motor control, which adjusts a gain in control of a servo motor, the gain adjustment method comprising:
    a gain adjustment process of adjusting the gain by repeatedly moving the servo motor between a predetermined start position and a predetermined movement position while changing the gain,
    wherein a position of the servo motor is returned to the start position at the start of the gain adjustment process, or when the servo motor is stopped in the middle of the gain adjustment process.

* * * * *